(12) United States Patent
Brook et al.

(10) Patent No.: US 8,567,200 B2
(45) Date of Patent: Oct. 29, 2013

(54) PROCESS

(76) Inventors: Peter Holroyd Brook, Berkshire (GB); Geoffrey Frederick Skinner, Reading (GB)

( * ) Notice: Subject to any disclaimer, the term of this patent is extended or adjusted under 35 U.S.C. 154(b) by 957 days.

(21) Appl. No.: 12/448,303

(22) PCT Filed: Nov. 29, 2007

(86) PCT No.: PCT/GB2007/004575
§ 371 (c)(1), (2), (4) Date: Dec. 10, 2009

(87) PCT Pub. No.: WO2008/074980
PCT Pub. Date: Jun. 26, 2008

(65) Prior Publication Data
US 2010/0083666 A1    Apr. 8, 2010

(30) Foreign Application Priority Data
Dec. 18, 2006   (EP) .................................. 06256419

(51) Int. Cl.
*F02C 1/00*   (2006.01)

(52) U.S. Cl.
USPC ........................... 60/772; 60/780; 60/39.182

(58) Field of Classification Search
USPC ................. 60/39.182, 645, 653, 780
See application file for complete search history.

(56) References Cited

U.S. PATENT DOCUMENTS

| | | | |
|---|---|---|---|
| 3,241,933 A | 3/1966 | Ploum et al. | |
| 3,446,747 A | 5/1969 | Bongiorno | |
| 3,795,485 A | 3/1974 | Bogart | |
| 4,193,259 A | 3/1980 | Muenger et al. | |
| 4,409,196 A * | 10/1983 | Skinner et al. | 423/359 |
| 4,725,380 A | 2/1988 | Pinto | |
| 4,733,528 A | 3/1988 | Pinto | |
| 4,999,030 A * | 3/1991 | Skinner et al. | 48/197 R |
| 4,999,992 A | 3/1991 | Nurse | |

(Continued)

FOREIGN PATENT DOCUMENTS

| | | |
|---|---|---|
| EP | 0 257 493 A1 | 8/1987 |
| EP | 0 413 199 A1 | 8/1990 |

(Continued)

OTHER PUBLICATIONS

International Search Report for PCT/GB2007/004575, mailed Feb. 29, 2008.

(Continued)

*Primary Examiner* — Phutthiwat Wongwian
(74) *Attorney, Agent, or Firm* — Nixon & Vanderhye (57) ABSTRACT

Production of concentrated $CO_2$ and electricity from a hydrocarbon feedstock by introducing an air feed stream and a methane fuel feed stream to an autothermal reactor (ATR) to produce synthesis gas, withdrawing a synthesis gas stream from the ATR and heat exchanging with a water stream to produce steam and heat exchanging the synthesis gas stream with a process stream to produce superheated steam. If necessary, steam is introduced to the synthesis gas stream before passing to a shift converter where synthesis gas reacts with steam to generate additional $CO_2$ and $H_2$. A shift converted gas stream is withdrawn from the shift converter and heat exchanged with a process stream to produce superheated steam. The shift converted gas stream is passed to a $CO_2$ separation unit to separate a concentrated $CO_2$ stream from a $H_2$ stream, and the $H_2$ stream is combusted in a gas turbine to produce electricity.

20 Claims, 1 Drawing Sheet

(56) References Cited

U.S. PATENT DOCUMENTS

| | | | |
|---|---|---|---|
| 5,264,202 A | 11/1993 | Snyder | |
| 5,715,671 A | 2/1998 | Griffiths | |
| 5,733,941 A | 3/1998 | Waycuilis | |
| 5,769,165 A | 6/1998 | Bross et al. | |
| 5,861,441 A | 1/1999 | Waycuilis | |
| 6,130,259 A | 10/2000 | Waycuilis | |
| 6,282,880 B1 | 9/2001 | Wallace et al. | |
| 6,314,715 B1 | 11/2001 | Stats | |
| 6,505,467 B1 | 1/2003 | Fjellhaug et al. | |
| 6,615,589 B2 | 9/2003 | Allam et al. | |
| 6,821,501 B2 | 11/2004 | Matzakos et al. | |
| 6,830,596 B1 | 12/2004 | Deckman et al. | |
| 6,916,562 B1 | 7/2005 | Gosselink et al. | |
| 8,006,478 B2* | 8/2011 | Buecker et al. | 60/39.182 |
| 2002/0085963 A1* | 7/2002 | Vidalin | 422/187 |
| 2005/0100490 A1 | 5/2005 | Burch et al. | |
| 2005/0109037 A1 | 5/2005 | Deckman et al. | |
| 2005/0132884 A1 | 6/2005 | Xu et al. | |
| 2007/0033949 A1* | 2/2007 | Raybold et al. | 60/780 |
| 2010/0167138 A1* | 7/2010 | Gattis et al. | 429/425 |

FOREIGN PATENT DOCUMENTS

| | | |
|---|---|---|
| EP | 0 884 099 A2 | 12/1998 |
| EP | 0 989 094 A2 | 3/2000 |
| EP | 1 105 625 A0 | 6/2001 |
| EP | 1 140 696 A0 | 10/2001 |
| EP | 1 140 697 A0 | 10/2001 |
| EP | 1 197 639 A2 | 4/2002 |
| EP | 1 230 203 A0 | 8/2002 |
| EP | 1 426 329 A1 | 6/2004 |
| EP | 1 543 874 A2 | 6/2005 |
| GB | 1 303 858 | 1/1973 |
| GB | 2 198 429 A | 6/1988 |
| WO | WO 97/33847 A1 | 9/1997 |
| WO | WO 98/01514 A1 | 1/1998 |
| WO | 00/03126 | 1/2000 |
| WO | WO 00/03126 A1 | 1/2000 |
| WO | WO 03/018958 A1 | 3/2003 |
| WO | WO 03/018959 A1 | 3/2003 |
| WO | WO 2004/022480 A2 | 3/2004 |
| WO | WO 2004/055322 A1 | 7/2004 |
| WO | WO 2004/055323 A1 | 7/2004 |
| WO | WO 2004/080573 A1 | 9/2004 |
| WO | WO 2005/007776 A1 | 1/2005 |

OTHER PUBLICATIONS

Written Opinion of the International Searching Authority for PCT/GB2007/004575, mailed Feb. 29, 2008.

Todd, D.M., et al; "Demonstrated Applicability of Hydrogen Fuel for Gas Turbines", *Proceedings of the IChemE*, "Gasification 4 the Future" Conference, Noordwijk, The Netherlands, Apr. 11-13, 2000, pp. 1-11.

Audus, H., et al; Decarbonisation of Fossil Fuels: Hydrogen as an Energy Carrier, *World Hydrogen Energy Conference*, vol. 1, Pt 23-28, June, pp. 525-534 (1995).

Versteele, W., et al; "Revamp of Ammonia Unit C Plant"; *Ammonia Technical Manual*, 11 pgs (1998).

Mitsugi, C., et al; "We-Net: Japanese Hydrogen Program"; *Int.. Hydrogen Energy*, vol. 23, No. 3 pp. 159-165 (1998).

Tindall, B.M., et al; "Alternative technologies to steam-methane reforming"; *Hydrocarbon Processing*, pp. 75-81 (1995).

Kvamsdal, H.M., et al; "A quantitative comparison of gas turbine cycles with $CO_2$ capture"; *Energy*, vol. 32, pp. 10-24 (2007).

Audus, H., et al; "$CO_2$ Capture by Pre-Combustion Decarbonisation of Natural Gas"; *Greenhouse Gas Control Technologies*; pp. 557-562 (1999).

Perry, M., et al; "$CO_2$ Recovery and Sequestration at Dakota Gasification Company"; pp. 1-11 (2004).

Todd, D.M., et al; "Demonstrated Applicability of Hydrogen Fuel for Gas Turbines", pp. 1-11.

Goldthorpe, S.H., et al; "System Studies on $CO_2$ Abatement from Power Plants"; *Energy Conversion and Management*; vol. 33, No. 5-8, pp. 459-466 (1992).

EA Greenhouse Gas R&D Programme: Decarbonisation of Fossil Fuels, Report PH2/2, pp. 1-118 (Mar. 1996).

Audus, H., et al; Decarbonisation of Fossil Fuels: Hydrogen as an Energy Carrier, *World Hydrogen Energy Conference*, vol. 1, Pt 23-28, June, pp. 525-53 (1995).

Nygaard, S., Innovation in Fuel Cells and Related Hydrogen Technology in Norway: Patents and Knowledge Interactions in a System of Innovation; *University of Oslo*, 2002/2003; Combined cycle, Wikipedia, 99 pgs.

* cited by examiner

PROCESS

This application is the U.S. national phase of International Application No. PCT/GB2007/004575, filed 29 Nov. 2007, which designated the U.S. and claims priority to European Application No. 06256419.0, filed 18 Dec. 2006, the entire contents of each of which are hereby incorporated by reference.

The present invention relates to a process for the production of carbon dioxide in concentrated form and electricity from a hydrocarbon feedstock, and, in particular, to a process where the concentrated carbon dioxide is injected into a hydrocarbon bearing formation via an injection well for displacement of the hydrocarbons towards an associated production well.

BACKGROUND OF THE INVENTION

It is known to produce electricity in a combined cycle power plant integrated with a reforming plant where a gas turbine is fuelled by hydrogen containing gas. Thus, International Patent Application number WO 00/03126 relates to a process for the production of electric energy, steam, and carbon dioxide in concentrated form from a hydrocarbon feedstock, comprising formation of synthesis gas in an air driven autothermal reactor unit (ATR); heat exchanging the formed synthesis gas and thereby producing steam, treating at least a portion of the synthesis gas in a CO-shift reactor unit and carbon dioxide separator unit for formation of concentrated carbon dioxide and a hydrogen containing gas which at least partly is combusted in a combined cycle gas turbine for the production of electric energy; and where air from said turbine unit is supplied to the ATR unit, that the exhaust from the gas turbine is heat exchanged for production of steam which together with steam generated upstream is utilized in a steam turbine for production of substantially $CO_2$-free electric energy.

SUMMARY OF THE INVENTION

The present invention provides an alternative process for generating carbon dioxide in concentrated form and electricity. Accordingly, the present invention relates to a process for the production of carbon dioxide in concentrated form and electricity from a hydrocarbon feedstock said process comprising the steps of:

a) introducing an air feed stream comprising air and optionally steam and a fuel feed stream comprising methane and optionally hydrogen and/or steam to an autothermal reactor unit (ATR) for the production of synthesis gas wherein (i) the temperature of the fuel feed stream is in the range 350 to 700° C., and (ii) the molar ratio of oxygen contained in the air feed stream to carbon (in hydrocarbons) in the fuel feed stream is from 0.45:1 to 0.85:1;

b) withdrawing a synthesis gas stream, comprising methane, hydrogen, carbon monoxide, carbon dioxide, nitrogen and optionally steam from the ATR and heat exchanging the synthesis gas stream with a water stream for the production of steam and subsequently heat exchanging the synthesis gas stream with at least one process stream selected from the group consisting of a hydrocarbon feedstock, a pre-reformer feed stream, the fuel feed stream, a hydrogen stream, boiler feed water, the air feed stream, and steam for the production of superheated steam;

c) if necessary, introducing steam to the synthesis gas stream before passing at least a portion of the synthesis gas stream to a shift converter unit where the synthesis gas reacts with steam to generate additional carbon dioxide and hydrogen;

d) withdrawing a shift converted gas stream from the shift converter unit and heat exchanging the shift converted gas stream with at least one process stream selected from the group consisting of a hydrocarbon feedstock, a pre-reformer feed stream, the fuel feed stream, a hydrogen stream, boiler feed water, the air feed stream, water for the production of steam, and steam for the production of superheated steam;

e) passing the shift converted gas stream to a carbon dioxide separation unit for the separation of a concentrated carbon dioxide stream from a hydrogen stream comprising hydrogen and nitrogen;

f) combusting at least part of the hydrogen stream in a gas turbine wherein the gas turbine drives an electric generator thereby producing electricity and wherein combustion of the hydrogen stream generates an exhaust gas.

Optionally, any superheated steam generated in steps (b) and/or (d) may be supplied to a steam turbine that drives an electric generator thereby producing additional electricity. The superheated steam generated in steps (b) and/or (d) may also be used to drive mechanical process equipment such as pumps and/or compressors, to heat the fuel feed stream, to provide energy for the carbon dioxide separation unit, to provide energy to dehydrate the concentrated carbon dioxide stream, or the steam may be exported to an external process duty. These uses may be as an alternative or, in addition, to using the steam to generate electricity.

Combustion of the hydrogen stream in the gas turbine in step (f) generates an exhaust gas. Optionally, the exhaust gas from the gas turbine may be heat exchanged with the steam produced in step (b) and/or with any steam produced in step (d) for the production of superheated steam. Optionally, the exhaust gas may also be heat exchanged with water for the production of steam and the generated steam may be further heated against the exhaust gas for the production of superheated steam. The superheated steam that is generated by heat exchange with the exhaust gas may be used for one or more purposes including supplying the steam to a steam turbine for the production of further electricity, using the steam to drive mechanical process equipment such as pumps and/or compressors, using the steam to heat the fuel feed stream, using the steam to provide energy for the carbon dioxide separation unit, using the steam to provide energy to dehydrate the concentrated carbon dioxide stream, or exporting the steam to an external process duty.

Thus, the process of the present invention relates to integrating an air-blown/driven autothermal reformer (ATR) with a combined cycle power plant. A combined cycle power plant is defined herein as a power plant having at least one gas turbine that drives an electric generator and optionally at least one steam turbine that drives an additional electric generator.

It is envisaged that the fuel feed stream may comprise one or more additional gaseous components selected from the group consisting of heavier hydrocarbons having two or more carbon atoms (hereinafter referred to as $C_{2+}$ hydrocarbons), carbon dioxide, nitrogen, and carbon monoxide.

The molar ratio of oxygen contained in the air feed stream to carbon (in hydrocarbons) in the fuel feed stream is from 0.45:1 to 0.85:1, preferably 0.6:1 to 0.7:1. The oxygen to carbon molar ratio refers to oxygen ($O_2$) contained in the air feed stream and to the carbon in the hydrocarbons of the fuel feed stream (excluding carbon in any carbon dioxide and/or carbon monoxide that is present in the fuel feed stream).

Optionally, the fuel feed stream that is introduced to the ATR comprises steam. Typically, the molar ratio of steam to carbon (in hydrocarbons) in the fuel feed stream that is introduced to the ATR is up to 3:1, preferably, up to 2.5:1. Preferably, the molar ratio of steam to carbon (in hydrocarbons) in the fuel feed stream is within the range of 0:1 to 3:1, preferably, 0.3:1 to 3:1, in particular 1:1 to 2.5:1. The steam to carbon molar ratio is based on the carbon in the hydrocarbons of the fuel feed stream excluding carbon in any carbon dioxide and/or carbon monoxide that is present in the fuel feed stream. Where steam is present in a process stream, mole % is based on % of total wet molar flow rate of the stream under discussion.

Optionally, the air feed stream comprises steam. Preferably, the amount of steam in the air feed stream is up to 10 mole %, in particular, up to 1 mole %. Where steam is also present in the air feed stream, it is preferred to adjust the amount of steam that is contained in the fuel feed stream so that the molar ratio of steam to carbon (in hydrocarbons) at the inlet to the ATR is within the range of 0.3:1 to 3:1 (based on the total moles of steam in the air feed stream and the fuel feed stream).

Optionally, the fuel feed stream that is introduced to the ATR comprises hydrogen. The presence of hydrogen in the fuel feed stream is advantageous owing to the hydrogen facilitating ignition of the fuel feed stream with the oxygen contained in the air feed stream. Typically, the amount of hydrogen in the fuel feed stream is within the range of 0 to 20 mole %, preferably, 2 to 20 mole %.

It is envisaged that the air feed stream and fuel feed stream may be introduced separately to the ATR. The relative rates at which the air feed stream and fuel feed stream are introduced to the ATR are such that the molar ratio of oxygen ($O_2$) contained in the air feed stream to carbon (in hydrocarbons) in the fuel feed stream is in the range of 0.45:1 to 0.85:1, preferably 0.6:1 to 0.7:1.

The fuel feed stream is introduced to the ATR at a temperature in the range of 350 to 700° C., preferably 400 to 650° C., in particular, 425 to 620° C. The fuel feed stream is preferably heated to the desired temperature by heat exchange of the fuel feed stream or a precursor of the fuel feed stream (such as a hydrocarbon feedstock and/or a pre-reformer feed stream) against the synthesis gas stream formed in step (b) and/or the shift converted gas stream formed in step (d), and/or against a steam stream. However, where, the fuel feed stream is introduced to the ATR at a temperature above 600° C., it may be preferred to boost the temperature of the fuel feed stream using an external heater. However, the present invention does not exclude boosting the temperature of the fuel feed stream by heat exchange against the exhaust gas from the gas turbine.

Preferably, the air feed stream is introduced to the ATR at a temperature within the range 200° C. to 730° C., typically, at a temperature in the range of 250 to 600° C., in particular 450 to 550° C. Preferably, the air feed stream may be heated to the desired temperature by heat exchange with the exhaust gas from the gas turbine. However, the present invention does not exclude heating the air feed stream to the desired temperature against the synthesis gas stream in step (b) or the shift converted gas stream in step (d).

Typically, the fuel feed stream is produced by passing a pre-reformer feed stream comprising a hydrocarbon feedstock and steam through a pre-reformer that contains a pre-reforming catalyst to obtain a fuel feed stream comprising methane, hydrogen, carbon monoxide, carbon dioxide and steam. If desired, the hydrogen content of the fuel feed stream may be increased. This may be achieved by multiple step pre-reforming, by using high pre-reformer inlet temperatures, or by recycling hydrogen to the fuel feed stream. For example, part of the hydrogen stream generated in step (e) may be recycled to the hydrocarbon feedstock or the pre-reformer feed stream (upstream of the pre-reformer) or to the pre-reformed stream (downstream of the pre-reformer).

The hydrocarbon feedstock may be selected from the group consisting of natural gas, liquefied petroleum gas (LPG) and various petroleum distillates (for example, naphtha), preferably, natural gas.

Where the hydrocarbon feedstock is a lean natural gas that contains low amounts of $C_{2+}$ hydrocarbons, there is no requirement to pre-reform the lean natural gas. Thus, the lean natural gas may be used directly as the fuel feed stream for the ATR. Optionally, the lean natural gas may be mixed with a portion of the hydrogen stream formed in step (e) thereby generating a fuel feed stream containing hydrogen, preferably, in an amount of from 2 to 20 mole %. Optionally, steam may be added to fuel feed stream in a molar ratio of steam to carbon (in hydrocarbons) of up to 3:1, preferably, 1:1 to 2.5:1. However, the present invention does not exclude pre-reforming of the lean natural gas.

Where the hydrocarbon feedstock is a natural gas that contains high amounts of $C_{2+}$ hydrocarbons (for example, ethane, propanes, and butanes), the natural gas feedstock and steam are preferably introduced to a pre-reformer arranged upstream of the ATR. Suitably, the molar ratio of steam to carbon (in hydrocarbons) in the pre-reformer feed stream at the inlet to the pre-reformer is in the range of 0.5:1 to 2.5:1. An advantage of having a pre-reformer upstream of the ATR is that the pre-reformed stream exiting the pre-reformer has a reduced content of $C_{2+}$ hydrocarbons and an increased content of hydrogen. Where there is a sufficiently high amount of $C_{2+}$ hydrocarbons in the natural gas feedstock, the hydrogen content of the pre-reformed stream may lie within the preferred range of 2 to 20 mole % for the fuel feed stream. However, if the hydrogen content of the pre-reformed stream is less than the preferred range for the fuel feed stream, a portion of the hydrogen stream formed in step (e) may be recycled to the natural, gas feedstock and/or the pre-reformed feed stream (upstream of the pre-reformer) and/or to the pre-reformed stream (downstream of the pre-reformer) to generate the fuel feed stream.

Where the hydrocarbon feedstock is a petroleum distillate (for example, naphtha), it is essential that a pre-reformer feed stream comprising the petroleum distillate and steam is passed through a pre-reformer (arranged ahead of the ATR) where the pre-reforming catalyst converts substantially all of the $C_{2+}$ hydrocarbons in the pre-reformer feed stream into methane, hydrogen, carbon monoxide and carbon dioxide. Suitably, the molar ratio of steam to carbon (in hydrocarbons) in the pre-reformer feed stream at the inlet to the pre-reformer is at least 1.0:1, preferably in the range 1.0:1 to 4.5:1, in particular, 1.0:1 to 3.0:1. It is envisaged that where the hydrocarbon feedstock is a petroleum distillate, the hydrogen content of the pre-reformed stream may lie within the preferred range for the fuel feed stream (2 to 20 mole % hydrogen). However, if the hydrogen content of the pre-reformed stream is less than the preferred range for the fuel feed stream, a portion of the hydrogen stream formed in step (e) may be recycled to the hydrocarbon feedstock and/or the pre-reformer feed stream (upstream of the pre-reformer) and/or to the pre-reformed stream (downstream of the pre-reformer) to generate the fuel feed stream. Accordingly, a pre-reformer containing a pre-reforming catalyst increases the flexibility with regard to the hydrocarbon feedstock.

Preferably, a desulfurisation unit comprising a hydrogenator and a desulfuriser is provided upstream of the ATR and pre-reformer (if present) to remove sulfur containing compounds from the hydrocarbon feedstock (natural gas, LPG, or petroleum distillate). Generally, the sulfur containing compounds are converted to hydrogen sulfide by reduction with hydrogen at an elevated temperature over a hydrodesulfurisation catalyst in the hydrogenator. Suitably, the hydrogen feed to the hydrogenator is a minor part of the hydrogen stream formed in step (e). Sufficient hydrogen is fed to the hydrogenator to ensure that substantially all of the organosulfur compounds contained in the hydrocarbon feedstock are converted into hydrogen sulfide over the hydrodesulfurisation catalyst. The hydrogen sulfide is then removed from the hydrocarbon feedstock in the desulfuriser by an absorbent, typically, zinc oxide. Where at least a portion of the hydrogen content of the fuel feed stream is derived from the hydrogen stream formed in step (e), the amount of hydrogen that is recycled to the hydrogenator is preferably sufficiently high for the fuel feed stream to contain the preferred amount of hydrogen of 2 to 20 mole %. However, it is also envisaged that part of the hydrogen stream produced in step (e) may be recycled to the desulfurised hydrocarbon feedstock downstream of the desulfurisation unit to ensure that the fuel feed stream contains the preferred amount of hydrogen. Where a pre-reformer is present, it is preferred to recycle part of the hydrogen stream produced in step (e) to the pre-reformed stream (downstream of the pre-reformer). Thus, a portion of the hydrogen stream formed in step (e) may be recycled both upstream and downstream of the desulfurisation unit.

Generally, the hydrocarbon feedstock (natural gas, LPG, or petroleum distillate) that is introduced to the desulfurisation unit is heated to a temperature in the range 180 to 420° C., for example, 230° C. by heat exchange with the synthesis gas stream formed in step. (b) and/or with the shift converted gas stream formed in step (d) and/or with steam. The hydrocarbon feedstock may be passed to the hydrogenator of the desulfurisation unit without any further heating provided that a low temperature hydrodesulfurisation catalyst, for example, a nickel molybdenum oxide hydrodesulfurisation catalyst is employed in the hydrogenator.

Where a pre-reformer containing a pre-reforming catalyst is arranged upstream of the ATR and the hydrocarbon feedstock is natural gas, the pre-reforming reaction is endothermic and results in a typical temperature drop of 30 to 100° C. across the pre-reformer, the temperature drop being dependent on the pre-reformer inlet temperature. It is therefore preferred that the pre-reformer feed stream (mixture of desulfurised natural gas feedstock and steam) that is passed into the pre-reformer is heated to a temperature in the range 400 to 650° C., more preferably 500 to 600° C. so that the fuel feed stream that exits the pre-reformer is within the preferred temperature range of 400 to 570° C. Typically, both the preheating of the natural gas feedstock prior to desulfurisation and the preheating of the pre-reformer feed stream (mixture of desulfurised natural gas feedstock and steam) that is passed into the pre-reformer is achieved by heat exchange with the synthesis gas stream formed in step (b) and/or with the shift converted gas stream formed in step (d) and/or with steam. As discussed above, where the pre-reformer feed stream is to be heated to a temperature in excess of 600° C., it may be convenient to employ an external heater, at least for the final stage of preheating. However, the present invention does not exclude boosting the temperature of the pre-reformer feed stream by heat exchange with the gas turbine exhaust.

Where a pre-reformer containing a pre-reforming catalyst is arranged upstream of the ATR and the hydrocarbon feedstock is a gaseous petroleum distillate, for example, naphtha, the pre-reforming reaction may become exothermic resulting in a temperature increase of typically 40 to 60° C. across the pre-reformer. This temperature increase aids heating of the fuel feed stream to the desired temperature of 350 to 700° C.

The autothermal reactor (ATR) is an air driven reactor. Suitably, the air feed stream to the ATR is compressed in a stand alone compressor. Preferably, the air is compressed in a multistage air compressor, for example a compressor having from 4 to 8 stages, preferably, 6 stages. As discussed above, optionally, steam may be added to the air in an amount of up to 10, mole %, in particular, up to 1 mole %. However, it may be advantageous to extract process air for the ATR at the discharge of the air compressor of the gas turbine and to boost the pressure of the air discharge stream to the required ATR-injection pressure.

The reactions in the autothermal reformer result in a significant temperature rise across the autothermal reformer. Typically, the synthesis gas stream that exits the ATR, at reforming equilibrium, is at a temperature in the range 800 to 1000° C., for example, approximately 900° C. and may be cooled by heat exchange with water. Preferably, the synthesis gas is cooled by heat exchange with a high pressure water stream in a waste heat boiler thereby generating high pressure (HP) steam. The synthesis gas stream is preferably further cooled against the desulfurised hydrocarbon feedstock in a pre-reformer feed heater. Finally, the remaining heat energy of the synthesis gas stream is preferably used to generate additional HP steam in a heat exchanger, typically a waste heat boiler. Thus, there may be two waste heat boilers associated with the ATR. Preferably, the HP steam is at a pressure in the range of 35 to 200 barg, preferably 50 to 150 barg. Typically, the HP steam is saturated HP steam. Suitably, the HP steam from the waste heat boiler(s) is further heated by heat exchange with the exhaust gas from the gas turbine to generate superheated high pressure steam. Typically, the superheated HP steam is at a temperature in the range of 450 to 600° C. Typically, the superheated HP steam is then passed to a steam turbine of the power plant. Preferably, the steam turbine of the power plant is a multistage steam turbine and the superheated high pressure steam is passed to the high pressure (first) stage of the steam turbine.

The steam that is fed to the pre-reformer may be a steam exhaust stream from the steam turbine or steam that is generated by heat exchange of water with the exhaust gas from the gas turbine thereby further integrating the pre-reformer with the combined cycle power plant. Preferably, the steam is introduced to the desulfurised hydrocarbon feedstock upstream of the pre-reformer. It is envisaged that the steam may be medium pressure (MP) steam, in which case it is preferred to take the MP steam from the exhaust of the first stage of the multistage steam turbine.

At least part of the cooled synthesis gas from step (b) is treated in a shift converter unit where the carbon monoxide is converted to carbon dioxide over a shift catalyst according to the water gas shift reaction (WGSR)

$$CO+H_2O \rightarrow CO_2+H_2.$$

Suitably, an excess of steam, preferably, MP steam, is added to the desulfurised hydrocarbon feedstock upstream of the pre-reformer so that sufficient steam is available for the water gas shift reaction. Alternatively, steam (preferably, MP steam) may be introduced into the cooled synthesis gas stream from step (b) prior to introducing the synthesis gas stream to the shift converter unit.

The shift converter unit may be a single shift reactor containing a shift catalyst. However, it is preferred that the shift converter unit comprises a high temperature shift reactor containing a high temperature shift catalyst and a low temperature shift reactor containing a low temperature shift catalyst.

The water gas shift reaction is exothermic and results in a significant temperature rise across the shift converter unit. Accordingly, the shift converter unit may be cooled by continuously removing a portion of the shift converted gas stream and cooling this stream by heat exchange with one or more process streams. Where the shift converter unit comprises a high temperature shift reactor and a low temperature shift reactor, the process gas exiting the high temperature shift reactor is generally cooled in two steps. In the first cooling step, the heat of the high temperature shift reaction may be used to generate high pressure (HP) steam, for example, in a high temperature shift waste heat boiler by heat exchange with a boiler feed water. In the second cooling step, the cooled gas exiting the waste heat boiler may be further cooled against a process stream selected from the group consisting of the hydrocarbon feedstock, a pre-reformer feed stream, the fuel feed stream, a hydrogen stream, boiler feed water, the air feed stream, and steam (for the generation of superheated steam) before entering the low temperature shift converter. The shift converted gas stream that exits the low temperature shift reactor is preferably cooled by heat exchange with at least one process stream selected from the hydrocarbon feedstock, a pre-reformer feed stream, the fuel feed stream, the hydrogen stream, the air feed stream, and boiler feed water.

The shift converted gas stream comprises primarily hydrogen, nitrogen, carbon dioxide and steam. Generally, the shift converted gas stream also contains minor amounts of carbon monoxide and methane. Owing to the presence of steam, an aqueous phase (condensate) condenses out of the cooled shift converted gas stream which must be separated from the shift converted gas stream. Typically, the condensate is separated from the cooled shift converted gas stream in a condensate drum. The shift converted gas stream may then be further cooled against at least one process stream selected from the hydrocarbon feedstock, the pre-reformer feed stream, the fuel feed stream, the air feed stream, and the hydrogen stream such that further condensate condenses out of the shift converted gas stream and is removed in a further condensate drum. The separated condensate may be passed to a stripper column or a saturator system for removal of volatile impurities, in particular, ammonia, hydrogen cyanide and carbon dioxide. Where the separated condensate is passed to a stripper column, steam is typically introduced at an intermediate position in the stripper column, a vapour stream (comprising steam and volatile impurities) is withdrawn overhead from the stripper column and a condensate stream is removed from the bottom of the stripper column. Suitably, the vapour stream is used as steam for the pre-reformer (if present) or the ATR. An advantage of using the overhead from the stripper as steam for the pre-reformer is that the volatile impurities are returned to the ATR and the shift converter unit. Accordingly, the concentrations of ammonia, methanol and hydrogen cyanide are at least partly re-equilibriated in the ATR and in the shift converter unit, thereby preventing an accumulation of these contaminants. Typically, the steam that is introduced to the stripper column is MP steam.

After removal of condensate, the shift converted gas stream is passed to a $CO_2$ removal unit for formation of a concentrated carbon dioxide stream and a hydrogen stream. Suitable $CO_2$ removal units include units that employ a membrane to separate the hydrogen stream from the concentrated carbon dioxide stream or units comprising a $CO_2$ absorber and $CO_2$ desorber that employ physical or chemical absorption solvents.

The concentrated carbon dioxide stream preferably comprises at least 98% $CO_2$ on a dry basis, the remainder being mostly hydrogen. Typically, the hydrogen gas stream may comprise trace amount of carbon oxides (CO and $CO_2$) and methane, for example, less than 500 ppm on a molar basis.

Preferably, the concentrated $CO_2$ stream is dehydrated to reduce its water content such that the dehydrated $CO_2$ stream has a dew point of approximately $-10°$ C. at the transportation pressure of the concentrated $CO_2$ stream thereby ensuring that liquid (water) will not condense out of the concentrated $CO_2$ stream. Typically, the concentrated $CO_2$ stream is dehydrated at a pressure of 20 to 60 barg. Suitably, the water content of the concentrated $CO_2$ stream is reduced in a suction knock out drum. The concentrated $CO_2$ stream is then compressed and the compressed $CO_2$ stream is passed through at least one dehydration bed (formed from, for example, a molecular sieve or a silica gel) or through a glycol dehydration unit (for example, a triethylene glycol dehydration unit) to reduce the water content still further.

Preferably, the dehydrated concentrated $CO_2$ stream is compressed and delivered to a pipeline for transfer to a reception facility of an oil or gas field where the concentrated $CO_2$ stream is used as an injection gas in the oil or gas field. The concentrated $CO_2$ stream is further compressed to above the pressure of the hydrocarbon-bearing formation of the oil or gas field before being injected into the hydrocarbon-bearing formation. The injected $CO_2$ displaces the hydrocarbons towards an associated production well for enhanced recovery of hydrocarbons therefrom. If any carbon dioxide is produced from the production well together with the hydrocarbons, the carbon dioxide may be separated from the hydrocarbons for re-injection into the hydrocarbon-bearing formation. It is also envisaged that the carbon dioxide may be injected into other subterranean formations (for example, a depleted hydrocarbon-bearing subterranean formation or an aquifer) or into a cavern for storage therein. It is envisaged that the carbon dioxide may be stored indefinitely in the subterranean formation or cavern.

An advantage of the process of the present invention is that the synthesis gas stream and hence the hydrogen stream have a relatively high nitrogen content. Accordingly, the hydrogen may be sufficiently diluted with nitrogen that there is no requirement to dilute the hydrogen stream with water in order to control the levels of NO in the exhaust from the gas turbine. This is advantageous as it allows for the elimination of water or steam as an additional diluent for the hydrogen stream. However, the present invention does not exclude the presence of water in the hydrogen stream. Suitably, the level of NO in the exhaust gas is less than 60 ppm, preferably, less than 25 ppm. Preferably, the hydrogen stream contains 35 to 65% by volume hydrogen, more preferably, 45 to 60% by volume hydrogen, for example, 48 to 52% by volume of hydrogen. It is envisaged that the hydrogen stream may comprise trace amounts of carbon oxides (CO and $CO_2$) and of methane.

As discussed above, optionally, the exhaust gas from the gas turbine may be heat exchanged with the steam produced in step (b) and/or any steam produced in step (d) for the production of superheated steam. The superheated steam so generated may then be passed to a steam turbine that drives an electric generator thereby producing further electricity. Also, as discussed above, the exhaust gas may be heat exchanged with the air feed to the ATR. Preferably, the exhaust gas is heat exchanged with at least one additional process stream in order to extract the maximum amount of heat from the exhaust gas.

Thus, the exhaust gas may be heat exchanged with the boiler feed water to the waste heat boiler(s) of the ATR and/or with the boiler feed water to the waste heat boiler of the shift converter unit. Suitably, the boiler feed water to the waste heat boiler(s) is heated to a temperature of at least 250° C., for example, a temperature of 300° C., by heat exchange with the exhaust gas. However, the temperature of the boiler feed water should be maintained at below its saturation temperature for the chosen feed pressure. Generally, the boiler feed water is at relatively high pressure, for example, about 140 barg. For safety reasons, it is preferred not to heat exchange the exhaust gas with either the hydrocarbon feedstock or the fuel feed stream.

Suitably, the various process streams are heat exchanged with the exhaust gas in a heat recovery unit that is arranged downstream of the gas turbine. Optionally, the temperature of the exhaust gas of the gas turbine is increased by providing the heat recovery unit with a post-firing system, for example, a post-firing burner. Suitably, the post-firing burner is fed with a portion of the hydrogen stream produced in step (e) and the hydrogen is combusted in the burner using residual oxygen contained in the exhaust gas. Suitably, the exhaust gas is raised in temperature in the post-firing system to a temperature in the range of 500 to 800° C.

Typically, the heat recovery unit is a heat recovery and steam generator unit (HRSG) that generates and superheats additional steam for use in the steam turbine and elsewhere in the integrated process of the present invention. Thus, in addition to superheating steam generated in step (b) and/or any steam generated in step (d), and to heating any process streams such as the air feed stream and the high pressure water feed to the waste heat boiler(s), the HRSG is capable of generating high pressure (HP) steam, medium pressure (MP) steam and low pressure (LP) steam and of superheating these steam streams. The HRSG may also be capable of reheating MP steam that is produced as an exhaust stream from the high pressure stage of a multistage steam turbine.

The HRSG is provided with a plurality of heating coils through which the various process streams are passed in heat exchange relationship with the exhaust gas (optionally, a post-fired exhaust gas). Typically the heating coils for the production of and superheating of the HP, MP and LP steam, and for heating boiler feed water may be arranged in the following sequence in the HRSG starting with the coil that lies closest to the exhaust inlet to the HRSG:

1. A HP steam superheater coil and MP steam reheater coil (second section) placed in parallel (at the same distance from the inlet to the HRSG);
2. A MP steam reheater coil (first section);
3. A HP superheater coil (first section);
4. A HP steam generator coil;
5. A MP steam superheater coil;
6. A boiler feed water high pressure preheater coil (second stage);
7. A MP steam generator coil;
8. A LP steam superheater coil;
9. A boiler feed water medium pressure preheater coil and boiler feed water preheater coil (first stage) placed in parallel (at the same distance from the inlet to the HRSG);
10. A LP steam generator coil.

The person skilled in the art will understand that the exhaust gas will be progressively cooled as it is heat exchanged with the various process streams. The person skilled in the art would also understand that the sequence of the coils may be varied provided that the HRSG is capable of heating the process streams to their required temperatures and of generating superheated steam at the three different pressure levels (HP, MP and LP steam).

Preferably, the superheated HP steam that is produced in the HRSG is at a pressure in the range 80 to 200 barg and a temperature in the range 450 to 600° C.

Preferably, the superheated MP steam that is generated in the HRSG is at a pressure in the range 25 to 50 barg and a temperature in the range 300 to 400° C.

Preferably, the superheated LP steam that is generated in the HRSG is at a pressure in the range 2 to 10 barg and a temperature in the range 200 to 300° C.

The cooled exhaust gas is discharged from the HRSG to the atmosphere through a stack. Preferably, the stack is provided with a continuous emission monitoring system for monitoring, for example, the NO content of the cooled exhaust gas.

Typically, the HP steam that is generated and superheated in the HRSG is mixed with the HP steam from the waste heat boiler(s) (that is superheated in the HRSG) and the combined superheated HP steam is passed to the HP stage of the steam turbine. Typically, a first portion of the MP steam exhaust from the high pressure stage of the steam turbine is fed to the MP reheater coil of the HRSG and the re-heated MP steam is then delivered to the medium pressure stage (middle stage) of the steam turbine. Typically, a second portion of the MP steam exhaust from the high pressure stage of the steam turbine is used as MP steam for the reforming and shift conversion of the fuel feed stream and optionally to strip impurities from the process condensate (see above). Optionally, a third portion of the MP steam exhaust from the high pressure stage of the steam turbine may be used, to provide heating duty to a fuel feed stream or the hydrogen stream that is combusted in the GT.

Where the $CO_2$ removal unit of the process of the present invention is a $CO_2$ absorber and $CO_2$ desorber, a minor portion of the LP steam generated in the HRSG is used as a reboiling steam to strip $CO_2$ out of the absorbent in the $CO_2$ desorber. However, a major portion of the LP steam is superheated in the HRSG and is delivered to the low pressure stage (final stage) of the steam turbine.

BRIEF DESCRIPTION OF THE DRAWINGS

The invention will be further described with reference to FIG. 1.

FIG. 1 shows a flow scheme for an air driven ATR. Throughout the following description, examples of temperatures and pressures are given at various stages of a process carried out in accordance with the present invention. However, it should be recognized that these temperatures and pressures are only illustrative of the anticipated conditions within the plant and actual values may vary for any particular process without departing from the present invention.

DETAILED DESCRIPTION OF THE INVENTION

Figure 1:
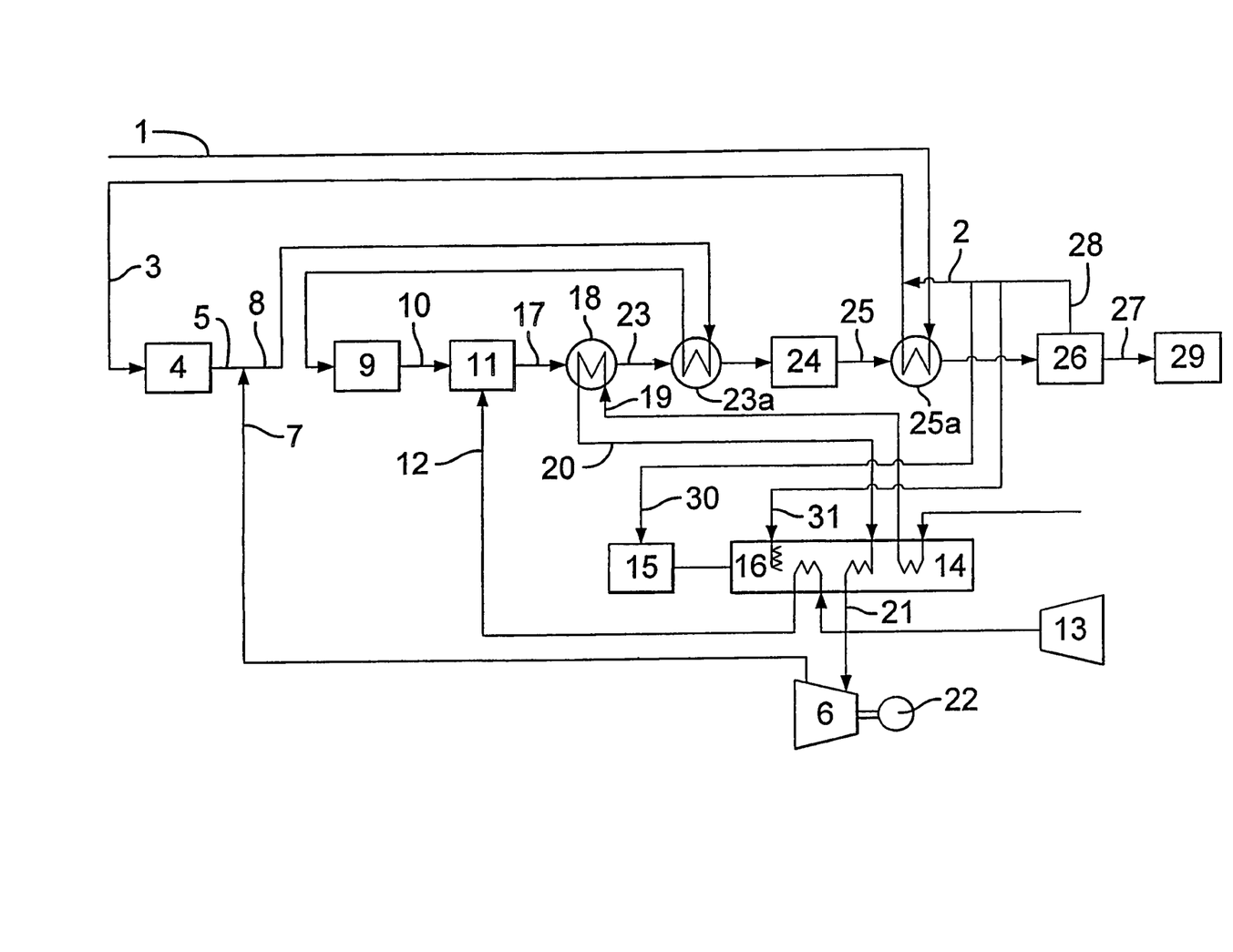

A pressurized natural gas feedstock 1 is heated to 380° C. by heat exchange against a shift converted gas stream (described below) and optionally against a superheated medium pressure (MP) steam stream (described below but not shown). A hydrogen stream 2 (described below) is added to the pressurized natural gas feedstock 1 and the resulting mixed stream 3 is preheated before being passed to a desulfurisation unit 4 comprising a hydrogenator (not shown) and a desulfuriser (not shown). In the hydrogenator, any organosulfur compounds (mercaptans) are converted to hydrogen sulfide by reduction with hydrogen over a hydrodesulfurisation catalyst. The hydrogen sulfide is then removed from the natural gas feedstock in the desulfuriser by absorption on a zinc oxide absorbent. A desulfurised natural gas feedstock 5 is withdrawn from the desulfurisation unit 4. Steam is introduced into the desulfurised natural gas feedstock 5 thereby generating a pre-reformer feed stream 8. The steam is taken as a medium pressure (MP) bleed from a steam turbine 6 and is introduced into the desulfurised hydrocarbon stream 5 via line 7. The pre-reformer feed stream 8 is introduced to a pre-reformer 9 at a temperature of at least 560° C. where at least a portion of the methane and of any $C_{2+}$ hydrocarbons contained in the natural gas feed are converted into hydrogen and carbon monoxide by reaction with steam over a pre-reforming catalyst. A pre-reformed (partially reformed) stream 10 exits the pre-reformer 9 at a temperature of 530° C. and acts as a fuel feed stream for an autothermal reformer (ATR) 11. A heated compressed air stream 12 (optionally comprising up to 10 mole % steam, in particular, up to 1 mole % steam) is also fed to the ATR 11 to initiate the reforming of the fuel feed stream to synthesis gas (a mixture of essentially hydrogen, carbon monoxide, carbon dioxide and steam). The feed rates of the fuel feed stream and the air feed stream are controlled such that the molar ratio of oxygen ($O_2$) contained in the air feed stream to carbon (in hydrocarbons) in the fuel feed stream is about 0.65:1. The air feed stream 12 is supplied from a compressor 13 and is heated by being passed through a heat recovery and steam generator (HRSG) 14 of a gas turbine 15 in heat exchange relationship with a post-fired exhaust gas 16.

A synthesis gas stream 17 exits the ATR 11 and is cooled in a waste heat boiler (steam generator) 18 by heat exchange with a boiler feed water stream 19. The boiler feed water stream 19 is pre-heated by being passed through the heat recovery and steam generator 14 of the gas turbine 15 in heat exchange relationship with the post-fired exhaust gas 16 and is introduced to the waste heat boiler 18 at a temperature of 310° C. with the pressure of the boiler feed water stream being sufficiently high that the boiler feed water is in a liquid state. High pressure steam is withdrawn from the waste heat boiler 18 at a temperature of 315° C. and is passed via line 20 to the HRSG 14 where the high pressure steam is superheated to a temperature of 480° C. by being passed through a heating coil of the HRSG 14 in heat exchange relationship with the post-fired exhaust gas from the gas turbine 15. The resulting superheated high pressure steam is passed via line 21 to a steam turbine 6 which drives an electrical generator 22.

A cooled synthesis gas stream 23 exits the waste heat boiler and the remaining thermal energy in the cooled synthesis gas stream is used to preheat the pre-reformer feed stream 8, preferably, in heat exchanger 23a and to generate further HP steam (not shown). The cooled synthesis gas stream is then fed to a shift converter unit 24 comprising a high temperature shift reactor (not shown) and a low temperature shift reactor (not shown) where carbon monoxide is reacted with water to give carbon dioxide and hydrogen over a water gas shift catalyst. A partially shift converted gas stream exits the high temperature shift reactor and the thermal energy in the partially shift converted gas stream is used to generate more high pressure (HP) steam in a waste heat boiler (not shown) and to pre-heat boiler feed water (not shown). The cooled partially shift converted gas stream is then passed to the low temperature shift reactor. A shift converted gas stream 25 comprising hydrogen, steam, nitrogen and carbon dioxide is withdrawn from the low temperature shift reactor. The thermal energy associated with the shift converted gas stream is used to heat the natural gas feedstock 1 in heat exchanger 25a, the hydrogen stream that is fed to the gas turbine and optionally boiler feed water. The cooled shift converted gas stream is passed to a first condensate drum (not shown) where condensate separates from the shift converted gas stream. Preferably, the shift converted gas stream is further cooled against one or more process streams such that further condensate condenses out of the shift converted gas stream, for example, the shift converted gas stream may be cooled against the reboiler duty of a $CO_2$ absorber-desorber unit. The cooled shift converted gas stream containing entrained condensate is then passed to a second condensate drum (not shown) where condensate separates from the shift converted gas stream. Condensate collected in the drums is fed to a condensate stripper where the condensate is stripped of volatile impurities (such as ammonia, hydrogen cyanide, methanol and carbon dioxide) with medium pressure (MP) steam. The vapour from the top of the stripper (comprising steam, and the volatile impurities) is introduced into the pre-reformer feed stream (not shown) to provide steam for the pre-reformer and also for the shift converter. A condensate stream having a reduced content of volatile impurities is withdrawn from the bottom of the condensate stripper and is passed to a condensate polishing unit (not shown) for removal of any remaining impurities, for example, formic acid. The condensate polishing unit provides demineralised water to the process of the present invention and also discharges excess water from the integrated reformer and power plant.

The shift converted gas stream that is withdrawn from the top of the second condensate drum is then passed to a $CO_2$ removal unit 26 for example, a $CO_2$ absorber and desorber, which separates the stream into a concentrated carbon dioxide stream 27 and a hydrogen stream 28.

The concentrated carbon dioxide stream 27 from the $CO_2$ removal unit 26 is then fed to a carbon dioxide compression and drying unit 29. The resulting pressurized and dehydrated concentrated carbon dioxide stream may be introduced to a pipeline that delivers the $CO_2$ to an injection well for enhanced recovery of hydrocarbons from a hydrocarbon-bearing formation via an associated production well.(not shown).

The hydrogen stream 28 from the $CO_2$ removal unit 26 is divided into three streams. A first hydrogen stream 2 is added to pressurized natural gas feedstock 1 (as described above). A second dry hydrogen stream is passed from the $CO_2$ removal unit 26 to a gas turbine 15 via line 30 where the second dry hydrogen stream undergoes combustion with air. The gas turbine 15 drives an electrical generator (not shown). A third dry hydrogen stream is passed from the $CO_2$ removal unit 26 to a post-firing burner of the HRSG 14 via line 31 for use as a post-firing fuel. The post-fired exhaust gas decreases in temperature as it passes through the HRSG 14 owing to heat exchange with the various process streams (for example, HP steam, boiler feed water and air feed to the ATR 11).

It is envisaged that the HRSG 14 may also be used to generate and superheat additional HP steam and to generate and superheat medium pressure MP and low pressure LP steam for use in the process of the present invention. In addition, the HRSG 14 may be used to reheat the exhaust steam (MP steam) from the first stage of the steam turbine 6.

The invention claimed is:

1. A process for the production of carbon dioxide in concentrated form and electricity from a hydrocarbon feedstock, said process comprising steps:
   a) introducing an air feed stream comprising air and a fuel feed stream comprising methane to an autothermal reactor unit (ATR) for the production of synthesis gas wherein (i) the fuel feed stream is at a temperature in a range of 350 to 700° C., and (ii) a molar ratio of oxygen contained in the air feed stream to carbon in hydrocarbons in the fuel feed stream is from 0.45:1 to 0.85:1;

b) withdrawing a synthesis gas stream comprising methane, hydrogen, carbon monoxide, carbon dioxide, nitrogen from the ATR and heat exchanging the synthesis gas stream with a water stream to produce steam and subsequently heat exchanging the synthesis gas stream with at least one process stream selected from the group consisting of a hydrocarbon feedstock, a pre-reformer feed stream, the fuel feed stream, a hydrogen stream, boiler feed water, the air feed stream, and steam to produce superheated steam;

c) passing at least a portion of the synthesis gas stream to a shift converter unit where the synthesis gas reacts with steam to generate additional carbon dioxide and hydrogen;

d) withdrawing a shift converted gas stream from the shift converter unit and heat exchanging the shift converted gas stream with at least one process stream selected from the group consisting of a hydrocarbon feedstock, a pre-reformer feed stream, the fuel feed stream, a hydrogen stream, boiler feed water, the air feed stream, water for the production of steam, and steam for the production of superheated steam;

e) passing the shift converted gas stream to a carbon dioxide separation unit for the separation of a concentrated carbon dioxide stream from a hydrogen stream comprising hydrogen and nitrogen;

f) combusting at least part of the hydrogen stream in a gas turbine wherein the gas turbine drives an electric generator thereby producing electricity and wherein combustion of the hydrogen stream generates an exhaust gas.

2. A process as claimed in claim 1 wherein the exhaust gas that is formed in step (f) is heat exchanged with steam selected from the group consistind of the steam produced in step (b) and any steam produced in step (d), for the production of superheated steam and the superheated steam is supplied to a steam turbine for the production of additional electricity.

3. A process as claimed in claim 1 wherein the exhaust gas is heat exchanged with water for the generation of steam, the generated steam is further heat exchanged with the exhaust gas for the production of superheated steam and the superheated steam is supplied to the steam turbine for the production of additional electricity.

4. A process as claimed in claim 1 wherein the fuel feed stream comprises hydrogen in an amount within the range of 2 to 20 mole %.

5. A process as claimed in claim 1 wherein the fuel feed steam comprises steam and wherein a molar ratio of steam to carbon in hydrocarbons in the fuel feed stream is up to 3:1.

6. A process as claimed in claim 1 wherein the fuel feed stream is produced by passing a preheated pre-reformer feed stream comprising a mixture of (i) a hydrocarbon feedstock selected from the group consisting of natural gas, liquefied petroleum gas (LPG) and petroleum distillates and (ii) steam through a pre-reformer to obtain fuel feed stream comprising methane and also hydrogen, steam and additionally carbon monoxide and carbon dioxide and wherein the pre-reformer feed stream is at least partly preheated by heat exchange with the synthesis gas stream produced in step (b) and/or the shift converted gas stream produced in step (d).

7. A process as claimed in claim 6 wherein part of the hydrogen stream formed in step (e) is recycled to the hydrocarbon feedstock or the pre-reformer feed stream upstream of the pre-reformer or to the pre-reformed stream downstream of the pre-reformer thereby generating a fuel feed stream having a hydrogen content of 2 to 20 mole %.

8. A process as claimed in claim 6 wherein a preheated hydrocarbon feedstock and part of the hydrogen stream formed in step (e) are passed through a hydrodesulfurisation unit arranged upstream of the ATR and pre-reformer thereby forming a desulfurised hydrocarbon feedstock and wherein the hydrocarbon feedstock is preheated by heat exchange with the synthesis gas stream produced in step (b) and/or with the shift converted gas stream produced in step (d) and/or with steam.

9. A process as claimed in claim 1 wherein an aqueous phase condenses out of the shift converted gas stream in step (d) and the aqueous phase is removed from the shift converted gas stream before passing the shift converted gas stream to the carbon dioxide separation unit in step (e).

10. A process as claimed in claim 1 wherein the air feed stream is preheated to a temperature in the range 200 to 730° C. by heat exchange with the exhaust gas that is formed in step (f) and/or with the synthesis gas stream in step (b) and/or with the shift converted gas stream in step (d).

11. A process as claimed in claim 1 wherein the concentrated $CO_2$ stream produced in step (e) is injected into a hydrocarbon-bearing subterranean formation for enhanced recovery of hydrocarbons therefrom or into a depleted subterranean formation, aquifer or cavern for storage therein.

12. A process as claimed in claim 1 wherein the hydrogen stream that is combusted in the gas turbine in step (f) comprises 35 to 65% by volume hydrogen.

13. A process as claimed in claim 1 wherein the exhaust gas from the gas turbine is heat exchanged with a process stream selected from the group consisting of the air feed stream, a fuel feed stream, the hydrogen stream that is combusted in the gas turbine, boiler feed water, water for the production of steam, and steam for the production of superheated steam in a heat recovery and steam generator (HRSG) unit arranged downstream of the gas turbine.

14. A process as claimed in claim 1 wherein the air feed stream additionally comprises steam.

15. A process as claimed in claim 1 wherein the fuel feed stream additionally comprises hydrogen.

16. A process as claimed in claim 1 wherein the fuel feed stream additionally comprises steam.

17. A process as claimed in claim 1 wherein the molar ratio of oxygen contained in the air feed stream to carbon in hydrocarbons in the fuel feed stream is from 0.6:1 to 0.7:1.

18. A process as claimed in claim 5 wherein the molar ratio of steam to carbon in hydrocarbons in the fuel feed stream is within the range of 1:1 to 2.5:1.

19. A process as claimed in claim 12 wherein the hydrogen stream that is combusted in the gas turbine in step (f) comprises 46 to 60% by volume hydrogen.

20. A process as claimed in claim 12 wherein the hydrogen stream that is combusted in the gas turbine in step (f) comprises 48 to 52% by volume hydrogen.

* * * * *

UNITED STATES PATENT AND TRADEMARK OFFICE
CERTIFICATE OF CORRECTION

PATENT NO. : 8,567,200 B2
APPLICATION NO. : 12/448303
DATED : October 29, 2013
INVENTOR(S) : Brook et al.

Page 1 of 1

It is certified that error appears in the above-identified patent and that said Letters Patent is hereby corrected as shown below:

On the Title Page

Item "(76)" should read item -- (75) --.

Left hand column "(73) Assignee", insert -- Hydrogen Energy International Limited, Surrey (UK) --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*